US008456284B2

(12) United States Patent
Rigazio et al.

(10) Patent No.: US 8,456,284 B2
(45) Date of Patent: Jun. 4, 2013

(54) DIRECTION AND HOLDING-STYLE INVARIANT, SYMMETRIC DESIGN, AND TOUCH- AND BUTTON-BASED REMOTE USER INTERACTION DEVICE

(75) Inventors: Luca Rigazio, San Jose, CA (US); Philippe Morin, San Jose, CA (US); David Kryze, Campbell, CA (US)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/442,181

(22) Filed: Apr. 9, 2012

(65) Prior Publication Data

US 2012/0194324 A1 Aug. 2, 2012

Related U.S. Application Data

(63) Continuation of application No. 12/115,102, filed on May 5, 2008, now abandoned.

(60) Provisional application No. 60/972,261, filed on Sep. 14, 2007.

(51) Int. Cl.

| | |
|---|---|
| ***G08C 19/16*** | (2006.01) |
| ***G08B 5/00*** | (2006.01) |
| ***G08B 1/08*** | (2006.01) |
| ***G05B 11/01*** | (2006.01) |
| ***G06F 3/041*** | (2006.01) |
| ***G06F 3/02*** | (2006.01) |
| ***G09G 5/00*** | (2006.01) |
| ***H04N 7/14*** | (2006.01) |
| ***H04N 7/00*** | (2011.01) |
| ***H04N 5/44*** | (2011.01) |

(52) U.S. Cl.
USPC .................... 340/12.5; 340/12.22; 340/815.6; 340/12.54; 340/539.14; 345/173; 345/156; 345/169; 348/14.05; 348/114; 348/734

(58) Field of Classification Search
USPC ............. 340/825.69, 825.72, 825.49, 825.25, 340/825.56, 825.17, 825.22, 825.24, 12.5, 340/12.22, 12.54, 539.14, 815.6, 539.1; 345/156, 158, 168, 169, 173; 341/175, 176; 348/734, 906, 161, 114, 14.05
See application file for complete search history.

(56) References Cited

U.S. PATENT DOCUMENTS 5,469,194 A 11/1995 Clark et al.
5,652,630 A 7/1997 Bertram et al.

(Continued)

FOREIGN PATENT DOCUMENTS

JP 09-251347 9/1997

*Primary Examiner* — Jennifer Mehmood
*Assistant Examiner* — Mirza Alam
(74) *Attorney, Agent, or Firm* — Harness, Dickey & Pierce, P.L.C.

(57) ABSTRACT

A remote control unit selectively transmits a control signal for remotely controlling an electronic device. The unit defines an imaginary cut plane that substantially bisects the unit. The unit includes a plurality of input features collectively disposed symmetrically with respect to the imaginary cut plane. The input features include a first and second input feature. The first and second input features are disposed on opposite sides of the cut plane. Furthermore, the unit includes a sensor that detects a first and second holding position of the unit. The first holding position and the second holding position are substantially opposite to each other. Moreover, the unit includes a controller that associates the control signal with the first input feature when the sensor detects the first holding position, and the controller associates the control signal with the second input feature when the sensor detects the second holding position.

26 Claims, 10 Drawing Sheets

U.S. PATENT DOCUMENTS

| | | | | |
|---|---|---|---|---|
| 5,724,106 | A | 3/1998 | Autry et al. | |
| 5,774,571 | A | 6/1998 | Marshall | |
| 5,956,019 | A * | 9/1999 | Bang et al. | 345/173 |
| 5,973,915 | A * | 10/1999 | Evans | 361/679.23 |
| 6,346,891 | B1 | 2/2002 | Feinleib et al. | |
| 6,396,523 | B1 | 5/2002 | Segal et al. | |
| 6,429,543 | B1 | 8/2002 | Desai | |
| 6,456,275 | B1 | 9/2002 | Hinckley et al. | |
| 6,765,557 | B1 | 7/2004 | Segal et al. | |
| 7,139,983 | B2 | 11/2006 | Kelts | |
| 2003/0156756 | A1 | 8/2003 | Gokturk et al. | |
| 2004/0196270 | A1 | 10/2004 | Chiu et al. | |
| 2004/0236699 | A1 | 11/2004 | Beenau et al. | |
| 2005/0162402 | A1 * | 7/2005 | Watanachote | 345/173 |
| 2005/0185788 | A1 * | 8/2005 | Daw | 379/369 |
| 2005/0259086 | A1 | 11/2005 | Chiu et al. | |
| 2006/0197750 | A1 * | 9/2006 | Kerr et al. | 345/173 |
| 2006/0197753 | A1 * | 9/2006 | Hotelling | 345/173 |
| 2006/0227030 | A1 | 10/2006 | Clifford et al. | |
| 2007/0066394 | A1 * | 3/2007 | Ikeda et al. | 463/37 |
| 2007/0152975 | A1 * | 7/2007 | Ogihara et al. | 345/173 |

* cited by examiner (Inverted)

(Right Hand)

(Left Hand)

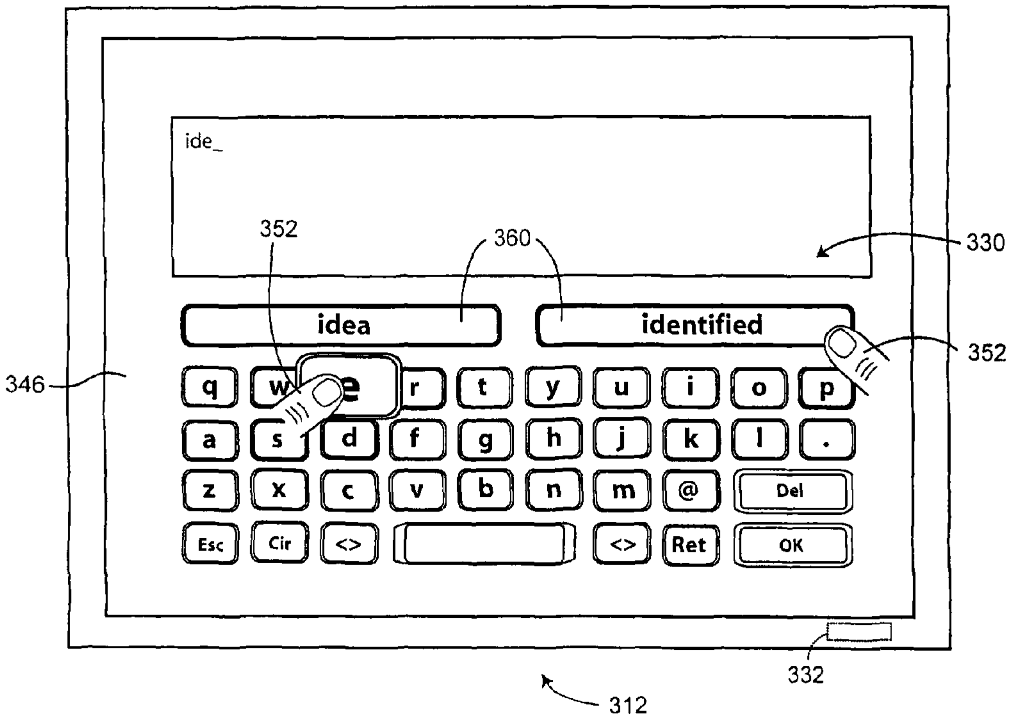
*Fig-9*
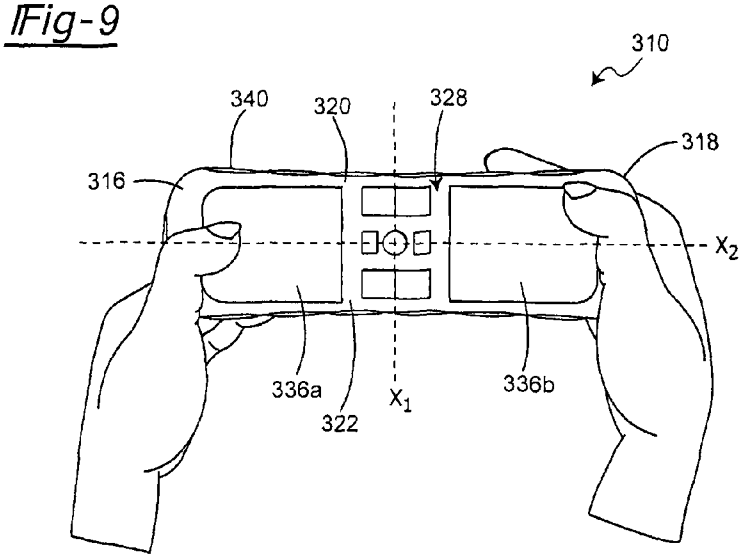

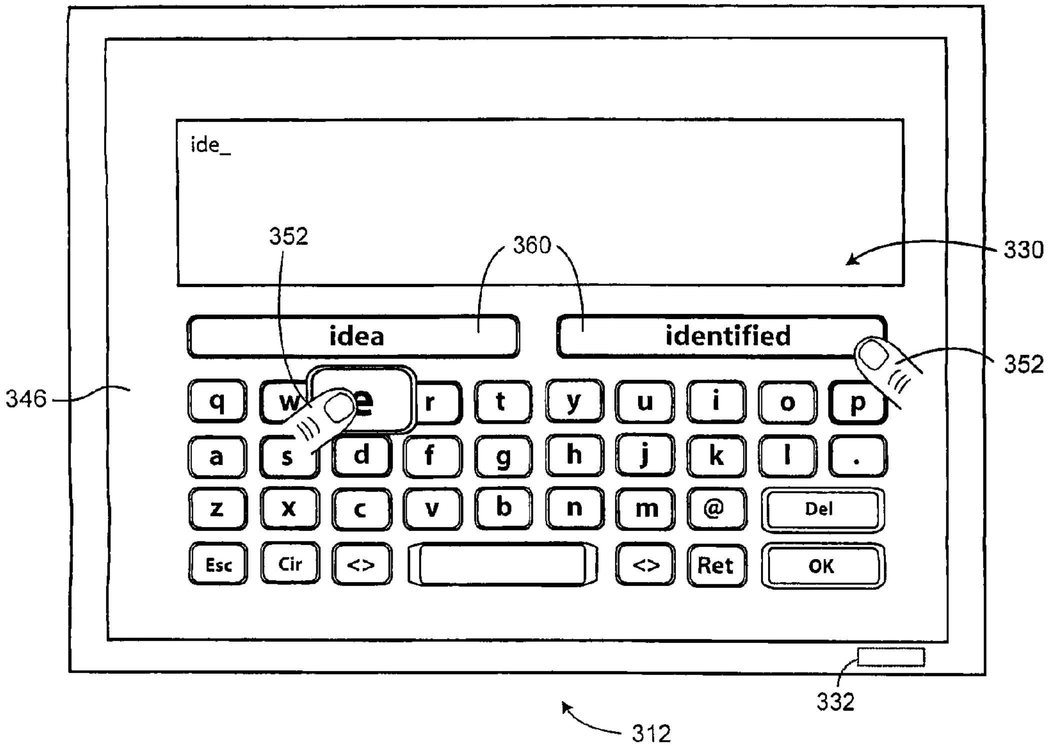
*Fig-10*
(Inverted)
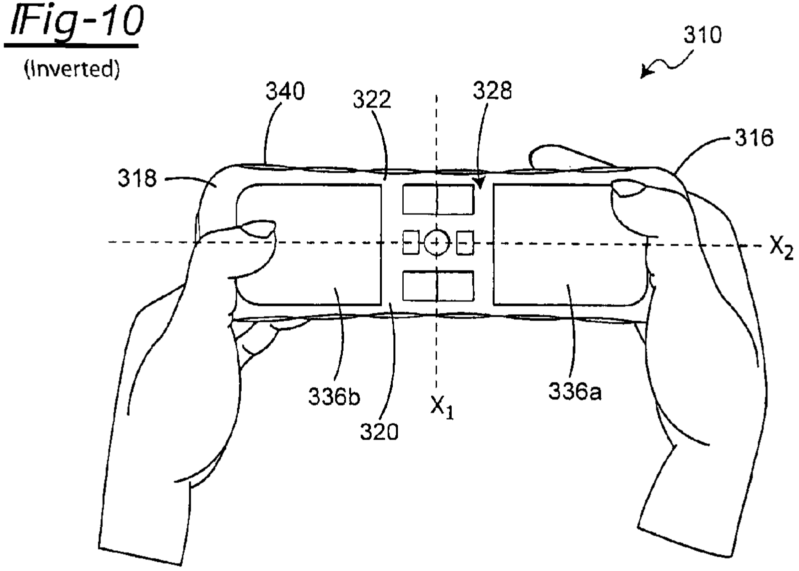

DIRECTION AND HOLDING-STYLE INVARIANT, SYMMETRIC DESIGN, AND TOUCH- AND BUTTON-BASED REMOTE USER INTERACTION DEVICE

CROSS-REFERENCE TO RELATED APPLICATIONS

This application is a continuation of U.S. application Ser. No. 12/115,102 filed May 5, 2008 which claims priority to U.S. Provisional Application No. 60/972,261 filed Sep. 14, 2007. The disclosures of the above applications are incorporated herein by reference.

FIELD

The present disclosure relates to a remote user interaction device and, more specifically, related to a direction and holding-style invariant, symmetric design, touch and button based remote user interaction device.

BACKGROUND

The statements in this section merely provide background information related to the present disclosure and may not constitute prior art.

Practically all consumer electronic products in use today come with a remote control. In most cases, the remote control has many buttons, each dedicated to the control of one or more specific features of the consumer electronics product. As these products increase in complexity, so does the number of buttons required. At some point, the increased number of buttons renders the remote control mostly useless for a large number of users.

SUMMARY

A remote control unit is disclosed that selectively transmits a control signal for remotely controlling an electronic device. The remote control unit defines an imaginary cut plane that substantially bisects the remote control unit. The remote control unit includes a plurality of input features collectively disposed in a substantially symmetric manner with respect to the imaginary cut plane. The input features include at least a first input feature and a second input feature. The first and second input features are disposed on opposite sides of the imaginary cut plane. Furthermore, the unit includes a sensor that detects at least a first holding position and a second holding position of the remote control unit. The first holding position and the second holding position are substantially opposite to each other. Moreover, the unit includes a controller that associates the control signal with the first input feature when the sensor detects the first holding position, and the controller associates the control signal with the second input feature when the sensor detects the second holding position.

A remote control system is also disclosed that includes an electronic device and a remote control unit that selectively transmits a control signal to remotely control the electronic device. The remote control unit defines an imaginary cut plane that substantially bisects the remote control unit. The remote control unit also includes a plurality of input features collectively disposed in a substantially symmetric manner with respect to the imaginary cut plane. The input features include at least a first input feature and a second input feature. The first and second input features are disposed on opposite sides of the imaginary cut plane. The remote control unit also includes a sensor that detects at least a first holding position and a second holding position of the remote control unit. The first holding position and the second holding position are substantially opposite to each other. The system also includes a controller that associates the control signal with the first input feature when the sensor detects the first holding position, and the controller associates the control signal with the second input feature when the sensor detects the second holding position. The system additionally includes a display that indicates which of the first and second input features is associated with the control signal.

Moreover, a method of operating a remote control system is disclosed. This system includes a remote control unit that defines an imaginary cut plane that substantially bisects the remote control unit. The remote control unit also includes a plurality of input features collectively disposed in a substantially symmetric manner with respect to the imaginary cut plane. The input features include at least a first input feature and a second input feature. The first and second input features are disposed on opposite sides of the imaginary cut plane. The method includes detecting one of at least a first holding position and a second holding position of the remote control unit. The first holding position and the second holding position are substantially opposite to each other. Also, the method includes associating the control signal with the first input feature when the sensor detects the first holding position. Additionally, the method includes associating the control signal with the second input feature when the sensor detects the second holding position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9 is a schematic view of the remote control system of FIG. 4A with the remote control unit in another holding position; and FIG. 10 is schematic view of the remote control system of FIG. 4A with the remote control unit in still another holding position.

DETAILED DESCRIPTION

The following description is merely exemplary in nature and is not intended to limit the present disclosure, application, or uses.

Figure 1A:
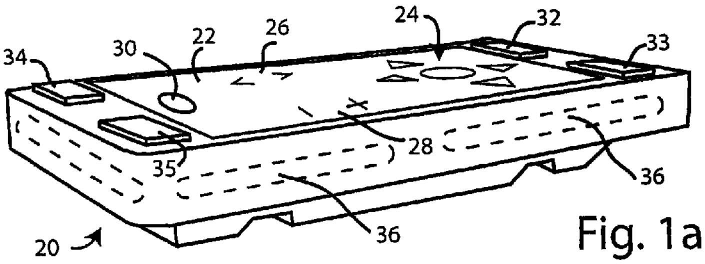
FIG. 1A is a perspective view of the remote control unit.
Figure 1B:
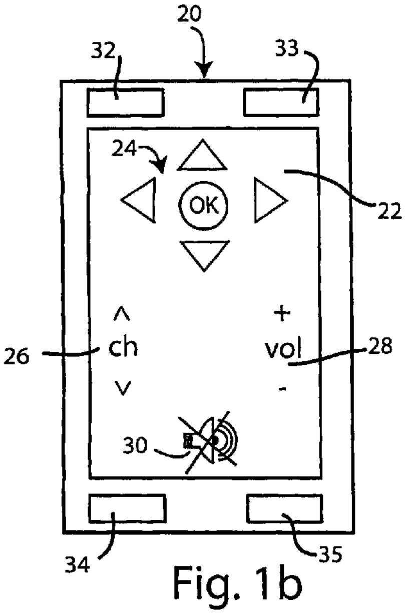
FIG. 1B is a plan view of the remote control unit.
Figure 1C:
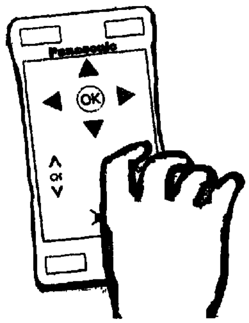
FIG. 1C is a view of the remote control unit in a portrait orientation.

Referring first to FIGS. 1A and 1B, the remote control unit 20 of the remote control system has been illustrated. This remote control unit interacts with a control circuit that is coupled to the consumer electronic equipment. The control circuit and consumer electronic equipment have not been showed in FIGS. 1A-1D but are shown in subsequent FIGS. 2 and 3.

The remote control unit 20 has a touchpad 22 that may include predefined clickable regions, such as the up-down-left-right-okay region 24, the channel up-down region 26, the volume up-down region 28 and the mute region 30. It will be understood that these predefined clickable regions are merely exemplary of the basic concept that the touch pad can have regions that respond to pressure as a way of signifying that the user has "selected" a particular function. While the basic design of the remote control unit strives to eliminate physical push buttons to a large extent, the remote control unit may still have physical push buttons if desired. Thus, for illustration purposed, four push buttons are shown at 32, 33, 34 and 35. It is also contemplated that the touchpad may be split into two distinct zones with or without a physical divider interposed between the two zones.

The pre-defined clickable regions may be visually designated on the touchpad surface by either silk screening the region graphics onto the surface of the touchpad, or by using a see-through graphic with backlighting. As will be more fully discussed below, the backlighting can be triggered by the appropriate combination of sensory inputs as recognized by the pattern recognizer also discussed below. It is contemplated that the touchpad surface may not include any pre-defined clickable regions.

The case of the remote control unit is preferably provided with a series of capacitive sensors, such as sensors 36 around the horizontal side walls of the case perimeter. Capacitive sensors can also be at other locations, such as on the underside of the case. These sensors detect how the user is holding the remote control. In this regard, different users may grip the remote control in different ways and the capacitive sensors are arranged to be able to discriminate these different ways of holding the remote control. Although there may be subtle differences in how one user holds the remote control as compared with another, the pattern recognition system, discussed below, can use this information to recognize these subtle differences. Moreover, the sensors in cooperation with the pattern recognition system enable a user to operate the remote independently of how the remote is being held.

Figure 2:
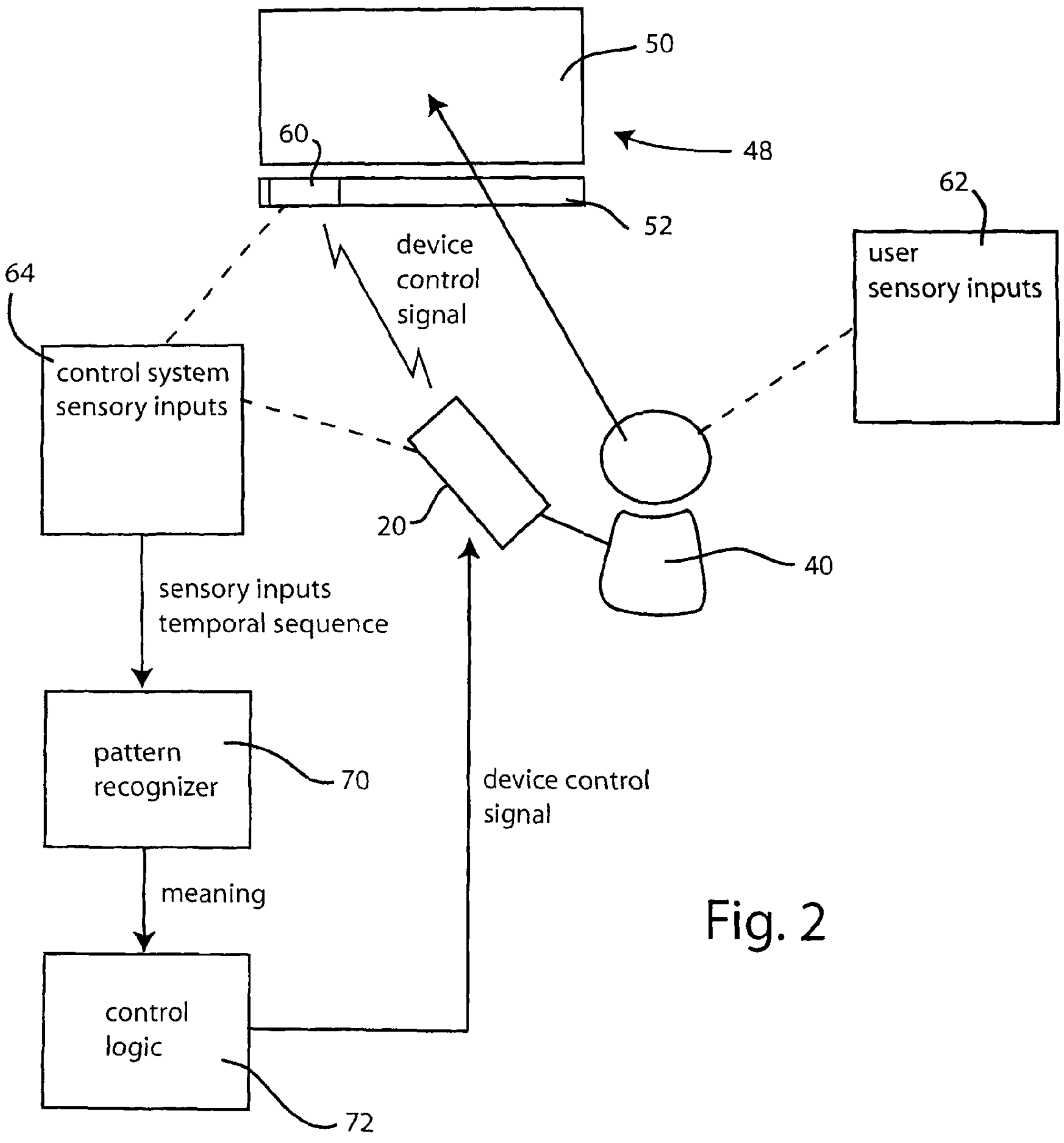
FIG. 2 is a system block diagram illustrating the remote control system in operation by a user to control a piece of consumer electronic equipment.

Referring now to FIG. 2, an overview of the pattern recognition system will be presented. FIG. 2 illustrates the remote control unit 20 being manipulated by a user 40 to operate a consumer electronic equipment component 48 having a display screen 50. The consumer electronic equipment 48 conventionally has its own electronics that are used to provide the equipment with its normal functionality. In the case of the illustrated component 48 such functionality includes displaying audio visual material on the display screen. This material may include, for example, television programs, pre-recorded content, internet content and the like. For illustration purposes, the associated electronics of the consumer electronic equipment 48 have been illustrated separately at 52. Embedded within the electronics package 52 is a control circuit shown diagrammatically at 60 that defines part of the remote control system. Control circuit 60 is coupled to the consumer electronic equipment and responds to commands sent from the remote control unit 20 to control the operation of the consumer electronic equipment.

The remote control system is made up of the remote control 20 and the control circuit 60. Together, these two components implement a sophisticated sensory input detecting and pattern recognizing system that allows the user 40 to control operations of the consumer electronic equipment 50 using a rich variety of finger, hand, wrist, arm and body movements. The system may be viewed as effecting a dialogue between the remote control unit 20 and the control circuit 60, where that dialogue is expressed using a vocabulary and grammar associated with a diverse variety of different sensory inputs, (e.g., from the touchpad, accelerometer, case perimeter, sensor, pressure sensors, RF signal sensors and the like). The control system also includes a feedback loop through the user 40. The user 40 has his or her own set of user sensory inputs (sight, sound, touch) and the user manipulates the remote control unit 20 based, in part, on audible and visual information obtained from the consumer electronic equipment, and on visual, audible and tactile information from the remote control unit. Thus, the remote control system supports a dialogue between remote control unit 20 and control circuit 60, with a concurrent dialogue between user 40, the control system and the consumer electronic equipment.

FIG. 2 thus illustrates that user 40 may receive visual, audible or tactile feedback from remote control 20 and this may be performed concurrently while viewing the display screen 50. For illustration purposes, the information acquired by user 40 are depicted diagrammatically as user sensory inputs 62. Likewise, the sensory inputs acquired by the control system (from a diverse array of different types of sensors) has been diagrammatically illustrated at 64.

The relationship between the control system sensory inputs 64 and the user sensory inputs 62 is a non-trivial one. The user will manipulate the remote control unit 20, in part, based on what the user is trying to accomplish and also, in part, based on what the user sees on the display 50 and what the user also senses audibly, visually or tactilely from the remote control unit and/or consumer electronic equipment. To illustrate this point, imagine that the consumer electronic equipment is a television set that has been programmed to block certain channels from being viewed by young children. In order to bypass the parental blocking feature, user 40 must manipulate the remote control unit in a predefined way. To prevent the child from simply watching the parent and learning the manipulating technique, the parental blocking unlocking feature can be changed each time it is used. The adult user must watch what is shown on the display screen in order to learn how to manipulate the control unit to unlock the parental blocking feature. The instructions on the display are presented in a form, such as textual instructions, that a young child is not able to read. Thus, the control of the parental blocking feature relies on a particular manipulation (e.g., flick the wrist three times) that is context-based. A later unlocking operation would be treated as a different context and would potentially have a different gestural command to effect unlocking. Although this is but one example the example illustrates that the behavior of the remote control system is context-dependent and that the user's sensory perception (e.g., reading the screen, feeling tactile vibrations, hearing particular sounds) will affect how the user's manipulations of the remote control unit are interpreted.

The control system is able to make sense of a rich and diverse collection of sensory inputs using a pattern recognizer 70 and associated control logic 72. As the user manipulates the remote control unit, sensory inputs are collected as a temporal sequence from the various sensors within the remote control unit. As previously noted, the sensors may include at least one touchpad responsive to manipulation by a user's fingers and at least one additional sensor such as, for example, an acceleration sensor responsive to movement of the remote control unit, case perimeter sensors such as capacitive sensors that discriminate which parts of the case are in contact with the user's body, pressure sensors responsive to pressing forces upon a predetermined region of the touchpad and RF signal sensors responsive to radio frequency signals transmitted from the control circuit 60.

The temporal sequence of sensory inputs is fed to the pattern recognizer 70. The pattern recognizer is configured to classify the received sensory input message according to a predetermined recognition scheme to generate message meaning data that are then sent to the control logic 72. The control logic 72 decodes the message meaning data and generates a device control signal. The device control signal may be supplied to the remote control unit itself, to effect control over the behavior of the remote control unit (e.g., putting the unit to sleep or waking the unit up) or the device control signal may be sent to and/or used by the control circuit 60, where it is passed on to the consumer electronic equipment as a command to control the operation of the consumer electronic equipment. The pattern recognizer 70 and the control logic 72 may be implemented separately or together and may be deployed in the control circuit 60, in the remote control 20, or distributed across both.

Figure 1D:
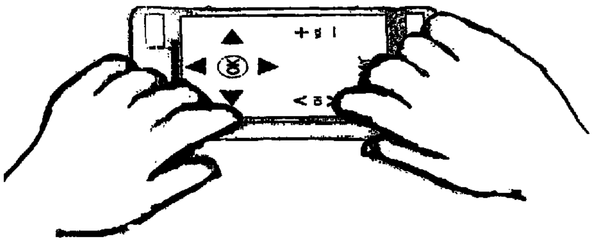
FIG. 1D is a view of the remote control unit in a landscape orientation.

In one embodiment, the pattern recognizer 70 employs a trained model that may be adaptively altered or customized to more closely fit each user's style of using the remote control unit. In such trained model embodiment, the pattern recognizer 70 is preferably provided with an initial set of models that classify certain operations as being mapped onto certain commands or control functions. For example, with reference to FIG. 1B, an upward sliding motion of the fingertip on channel up-down region 26 might launch a forward channel scanning mode, whereas a single click or finger press upon the upward arrow of the region 26 would simply increment the channel by one. This behavior might be classified differently, however, if the remote control unit is positioned in landscape orientation as illustrated in FIG. 1D. For example, when in landscape orientation and held by two hands (as determined by the capacitive sensors), the channel up-down region 26 might perform a function entirely unrelated to channel selection.

To adapt the model for a particular user, the preferred embodiment includes a sensory input mechanism to allow the user to inject a meta command—to let the system know that the user wishes to alter the pattern recognition models either for himself or herself, or for all users. For example, a rapid back and forth wrist motion (analogous to shaking one's head in a "no" gesture) might be used to inform the recognition system that the most recent pattern recognition conclusion was wrong and that a different behavior is desired. For example, assume that the user has used the remote control unit on a coffee table and then manipulates the channel up-down region 26, causing the television to begin a channel-scanning mode. Perhaps the user would prefer that the channel scanning mode should not be initiated when the remote control unit is resting on the coffee table (i.e., not being held). To change this behavior, the user would pick up the remote control unit and shake it back and forth in a "no" gesture. This would cause an on-screen prompt to appear on the television display 50, instructing the user how the most recent temporal sequence of sensory inputs can be modified in this context to result in a different device control signal outcome.

Because the pattern recognizer 70 can respond to a rich variety of different types of sensory inputs, the control system is able to interpret the meaning of user manipulations and gestures that can be quite complex, thereby allowing the user to interact in an intuitive or natural way that can be customized from user to user. In this regard, there may be instances where two or more gestural commands might be very similar and yet might have different meanings and thus might require different commands to be sent to the consumer electronic equipment. To handle this, the pattern recognizer 70 may be based on a statistical model where the control system sensory inputs generate probability scores associated with a plurality of different meanings. The pattern recognizer would (a) select the meaning with the highest score, if that score is above a predetermined probability threshold value and/or above the next-most value by a predetermined threshold, or (b) engage the user in a dialogue on-screen to resolve which meaning was intended, if the preceding threshold conditions are not met. The results of such user interaction may then be used to fine tune or adapt the model so that the system learns what behavior is expected for subsequent use.

Figure 3:
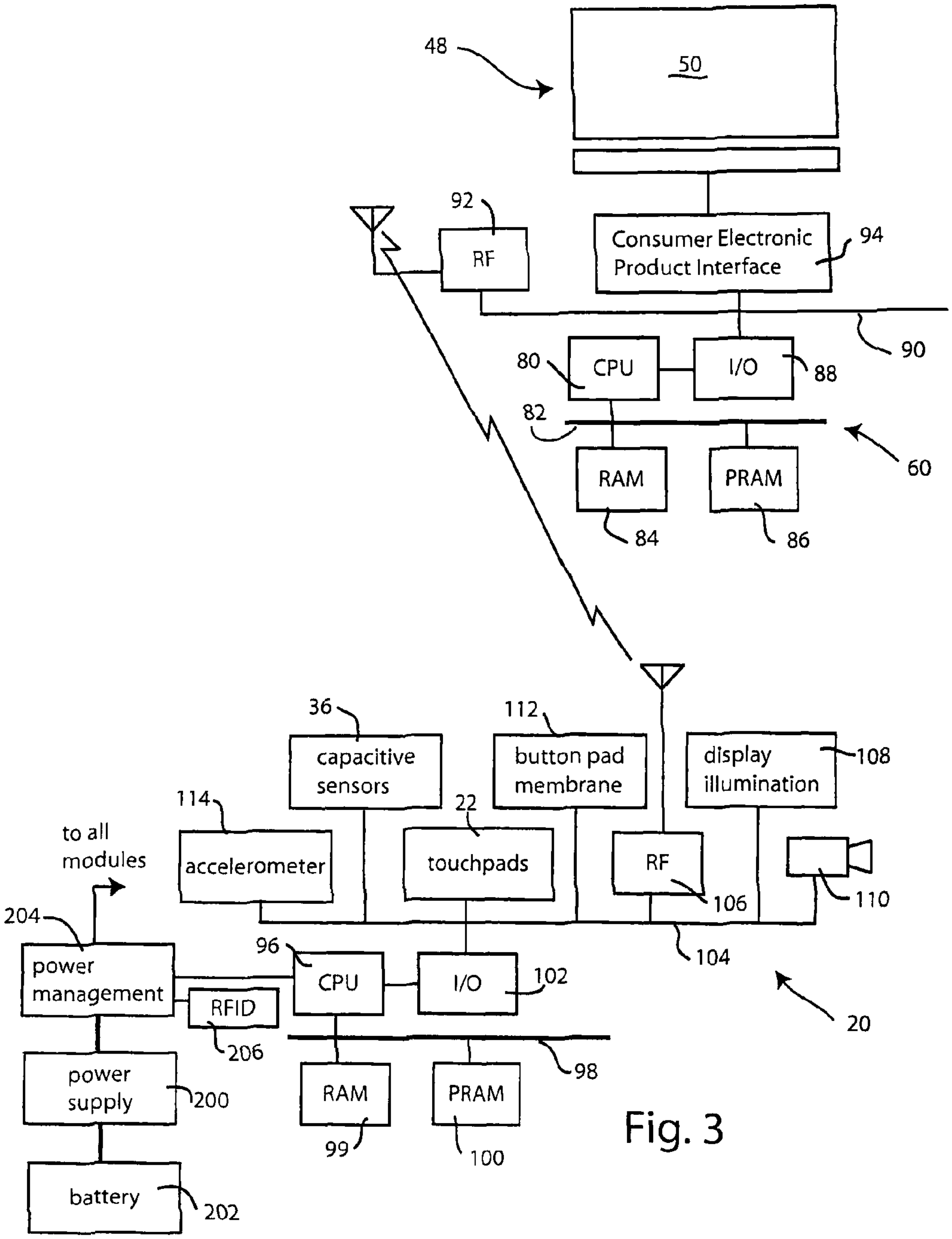
FIG. 3 is a block diagram illustrating an exemplary embodiment of the remote control system, including components associated with the control circuit coupled to the consumer electronic equipment and associated with the remote control unit.

With the above overview in mind, refer now to FIG. 3 where a detailed description of the remote control unit and control circuit hardware has been illustrated. In FIG. 3, the components associated with the control circuit are shown generally at 60 and the components associated with the remote control unit are shown generally at 20. The consumer electronic equipment is shown at 48.

Beginning with the control circuit 60, a first processor or CPU 80 is attached to a bus 82, to which random access memory 84 and programmable nonvolatile random access memory 86 are attached. The first processor includes an input/output (I/O) module 88 that provides an I/O bus 90 to which an RF communication module 92 and consumer electronic product interface 94 are attached. The consumer electronic product interface 94, in turn, couples to the remaining circuitry of the consumer electronic equipment 48. The radio frequency communication module 92 includes an antenna and is designed to communicate with a corresponding communication module associated with the remote control unit 20.

The remote control unit 20 has a second processor 96 with associated bus 98, random access memory 99 and nonvolatile programmable random access memory 100. The processor 96 also has an I/O module 102 that supports an I/O bus 104 to which a variety of sensors and other devices may be attached. Attached to the I/O bus 104 is the RF communication module 106 that communicates with its counterpart module 92 of the control circuit 60. The display illumination device 108 is also coupled to the I/O bus 104 so that the backlighting can be switched on and off to render any backlit graphical elements on the touchpad visible or invisible. A tactile feedback annunciator/speaker 110 is coupled to the I/O bus. The annunciator/speaker may be activated to produce tactile feedback (vibrations) as well as audible tones.

As previously discussed, the remote control unit includes an assortment of different sensors. These include the touchpad or touchpads 22, a button pad membrane switch assembly 112, accelerometer 114 and capacitive sensors 36. The button pad membrane switch assembly may be physically disposed beneath the touchpads so that pressure upon the touchpad will effect a switch state change from off to on. If desired, the button pad membrane switch assembly 112 may employ pressure-sensitive switches that can register a range of pressures, as opposed to a simple on/off binary state.

Because the remote control unit is designed to sit on the coffee table when not in use, a battery power supply is preferred. Thus, the power supply 200 includes a removable battery 202 as well as a power management circuit 204. The power management circuit supplies power to the second processor 96 and to all of the modules within the remote control unit requiring power. Such modules include all of the sensors, display illumination, and speaker/annunciator components attached to the I/O bus 104. If desired, an RFID tag 206 may be included in the remote control unit circuitry. The RFID tag can be used to help locate the remote control from the control circuit 60 in the event the remote control unit is lost.

Further Implementation Details of Preferred Embodiments

The Touchpad Sensor

The touchpad sensor can be segmented to provide several different intuitive zones of interaction. The touchpad is also clickable by virtue of the button pad membrane switch assembly located beneath or embedded within it. The clickable touchpad can register pressure information and react to pressure (both mechanically and electrically) by sending a specific signal while providing sufficient haptic feedback to the user such as through vibrations and sounds via the annunciator/speaker 110. The touchpad allows for the use of at least two contact points simultaneously. (e.g., two finger input) such as one contact point per side of the pad. The touchpad can be viewed as divided in two along a medial line (e.g., separating the right and left sides of the touchpad when held in a landscape orientation). The touchpad can thus be constructed using two single-position registering touchpads mounted side by side, or one single multi-touch touchpad with the ability to register with equal precision (two points of contact at the same time).

Physical Buttons

Although not required in all embodiments, the remote control unit may have a complement of physical buttons. In this regard, four buttons 32-35 have been illustrated in FIGS. 1A and 1B. These physical buttons may be implemented using the same button pad membrane switch assembly 112 (FIG. 3) embedded beneath the touchpad. The physical buttons, like the context-dependent virtual buttons on the touchpad surface, can be backlit to reveal button function names.

Redefining Regions of Interaction

To allow for natural operation, the remote control unit uses its pattern recognition system to interpret the sensory data. Included in the sensory data are inputs from the accelerometer or accelerometers and the capacitive sensors placed around the periphery and the bottom of the case. The user will naturally turn the remote control unit in his or her hands to best accommodate what he or she is trying to accomplish. The pattern recognition system interprets how the user is holding the remote control unit and redefines these zones of interaction so that they will appear to be at the same place, no matter how the remote is oriented. For instance, the remote control unit can be used with one or two hands, and in both landscape and portrait orientation. The pattern recognition system can discriminate the difference and will automatically redefine the zones of interaction so that the user can perform the most probably operations in the easiest manner for that user. The zones of interaction include, for example, different zones within the touchpad. Different regions of the touchpad may be dedicated to different functions or different user manipulation styles. In addition, the remote control unit itself can be manipulated into different virtual "zones of interaction" by employing different gestures with the remote in mid-air, such as a quick flick of the wrist to change channels.

Power Management

The presently preferred embodiment is contemplated for very low power consumption. For example, the remote control unit may run on a single AA or AAA battery or batteries for approximately one year. With currently available technology, the wireless circuitry associated with RF modules consumes more power than the touch sensors; and the accelerometers and actuators consume less power than the touch sensors. For this reason, the power management circuitry 204 places the wireless circuitry in a sleep mode (or turned off altogether) after a short period of time after the remote control unit is no longer being used (e.g., 30 seconds). The touch sensors will then be placed in sleep mode (or turned off) after a somewhat longer period of time (e.g., 2 minutes). This will allow turning on the wireless circuitry again (in case the user touches the surface of the touchpad or picks up the unit within two minutes). The accelerometers are put into a low power mode where the circuitry checks the accelerometer status at a much lower rate than the normal accelerometer refresh rate. In this regard the normal refresh rate might be on the order of 50 Hz whereas in the low power mode the refresh rate might be in the order of 1 Hz, or even 0.1 Hz. The power management circuitry 204 would implement a turn on sequence that is essentially the reverse of the turn off sequence, with the accelerometer refresh rate being increased to full rate first, followed by reactivation of the touch sensors and finally by activation of the wireless circuitry. In the sleep mode, the RF modules may periodically be awakened, to check to see if there are any pending messages from the control circuit 60.

In the presently preferred embodiment, the remote control unit does not have a dedicated power-on button, as this might be a potential source of user confusion as to whether such button powers on the remote control unit or the television. Thus, the pattern recognition system is used to handle power-on in an efficient manner. The remote control unit turns on when the user first picks it up. For this reason, the system first checks the lower resolution acceleration data to determine if the remote has been moved. If so, the capacitive sensors are next energized to determine if the remote is actually being held (as opposed to simply being inadvertently pushed or moved when resting on the coffee table). If the pattern recognition system determines that the remote control unit is being held, then next the touchpads and finally the wireless circuitry are activated.

Alternatively, power-on can be triggered by a specific gesture, such as shaking the remote control unit. More complex power-on operation can also be utilized, for example, to enforce parental control as discussed above in connection with parental blocking features.

The pattern recognition system will likewise detect when it is time to turn the remote control unit off by detecting inactivity, or if detecting that the television has been turned off. This latter event would be detectable, for example, by information communicated via the RF modules.

Remote Finder

The control circuit 60, associated with the consumer electronic equipment, may include a button that will send a remote location message to the remote control unit. The user would push this button if the remote control unit has gotten misplaced. The control circuit would then periodically send a tell-me-where-you-are signal to the remote via RF. When the remote control unit's RF module next wakes up and finds the wake up signal, it will activate the haptic feedback system (e.g., speaker/annunciator 110) causing the unit to make sound and/or vibrate and optionally use the display illumination circuitry 108 to turn the backlighting on. In addition, if desired, the remote control unit and the control circuitry can use RF ranging functionality to measure the distance between the remote control unit and the control circuit. This information has been used to display the distance on the display 50, or even present a picture of the room with highlighted areas identifying where the remote control unit could be. Alternatively, the RFID tag 206 may be used, allowing the precise location of the remote control to be displayed on the display screen 50.

Tight Coupling Between Remote Control System and on-Screen User Interface

As illustrated by the previously discussed example regarding parental control, the remote control system is able to capitalize on its tight coupling with the on-screen information. The on-screen information, such as instructions on how to deactivate the parental blocking feature, may be stored in the programmable random access memory 86 of the control circuit (FIG. 3) and may then be projected onto the display 50 as an overlay upon the presently viewed program. First, by displaying information to the user on the display screen, the user does not need to look at the remote control unit in order to operate it. If the user needs to enter input, such as a spelled word, an overlay image of a keyboard may be presented and the user can navigate to the desired keys by simply manipulating the touch pad while watching a cursor or cursors (one for each finger) on the displayed overlay keyboard. If desired, the remote control system circuitry can also obtain program guide information and the display overlay can then allow the user to select which programs to view or record by simply manipulating the touch pad.

One can better understand the effectiveness of the remote control system by considering where the functionality of the system has been placed. By tight integration with the display screen, the remote control system can use the display screen, with its high resolution graphics capability, to provide an unlimited amount of visual information to the user which would be virtually impossible to provide through a set of dedicated buttons as conventional controllers do. The rich collection of diverse sensory inputs allows the user to adopt many different, and even redundant, ways of communicating the user's desires to the system. Interpretation of the diverse collection of sensory inputs by the pattern recognizer handles much of the complexity of converting the user's gestural and touch commands into message meaning data that correlate to functions that the consumer electronic equipment can perform. The resulting division of labor produces a control system that provides both a very high, visually engaging information content to the user regarding his or her control system choices, with an equally rich collection of gestural and touch commands that the user can employ to get his or her message across to the control system. Compare this to the conventional push button remote control that requires one button, or a sequence of buttons, to be pressed for each desired function, with the added inconvenience that the user must look at the remote control in order to find the desired button to push.

Referring now to FIGS. 4A through 10, other aspects of the present disclosure will be further discussed. Specifically, another embodiment of the remote control unit is illustrated and is indicated generally at 310. The remote control unit 310 is shown in detail in FIGS. 4A and 4B. The remote control unit 310 can be incorporated in a remote control system 312 illustrated in FIGS. 5-10 and discussed in greater detail below.

Figure 4A:
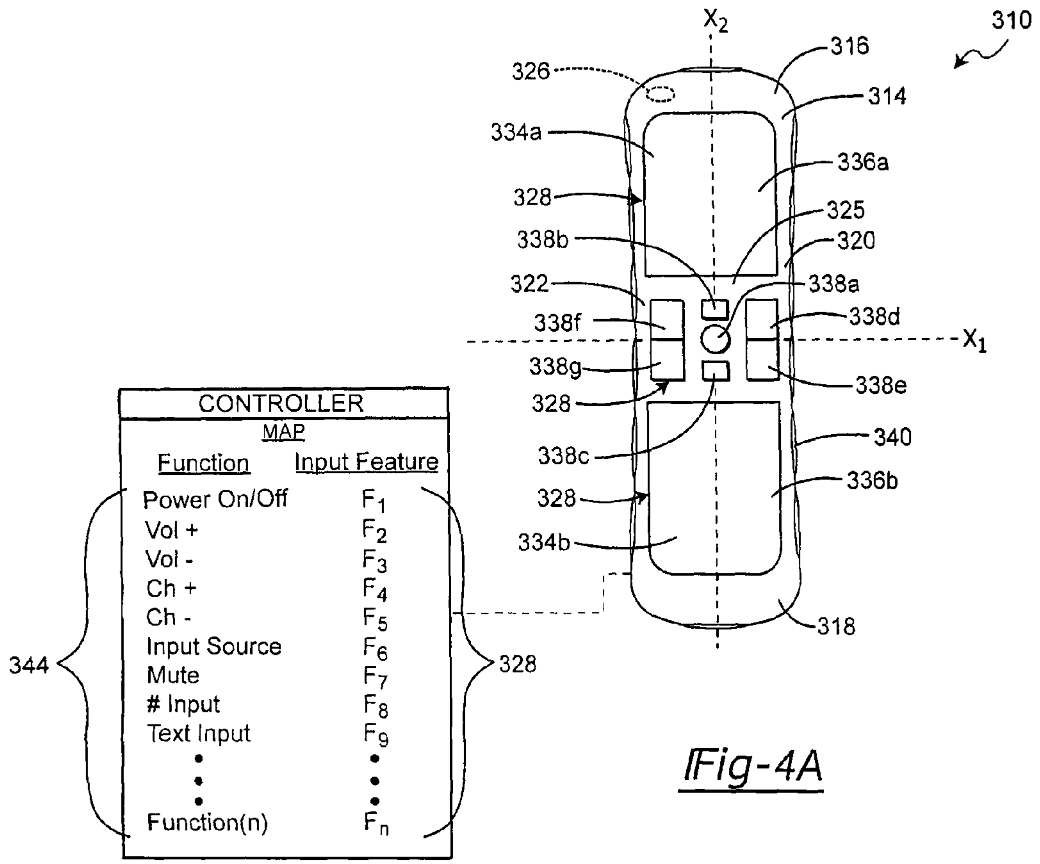
FIG. 4A is a top view of a remote control unit according to the teachings of the present disclosure.
Figure 4B:
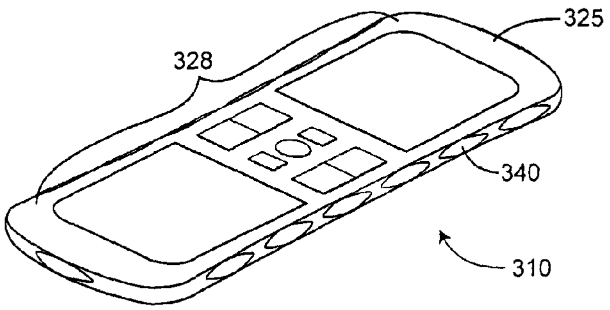
FIG. 4B is a perspective view of the remote control unit of FIG. 4A.

Referring initially to FIGS. 4A and 4B, the remote control unit 310 will be discussed in greater detail. The remote control unit 310 generally includes a casing 314. The casing 314 in some embodiments is generally elongate, rectangular, and box-like so as to be held comfortably in one or two hands. The casing 314 defines a first end 316, a second end 318 opposite the first end 316, a first side 320, and a second side 322 opposite the first side 320. The first and second sides 320, 322 are generally perpendicular to the first and second ends 316, 318. Furthermore, the casing 314 generally defines a top face 325. It will be appreciated that the remote control unit 310 can have any suitable shape without departing from the scope of the present disclosure.

The casing 314 also defines at least one imaginary cut plane that substantially bisects the remote control unit 310. In the embodiments represented in FIG. 4, the casing 314 defines a first imaginary cut plane $X_1$ and a second imaginary cut plane X2. (Each imaginary cut planes X1, X2 are represented in FIG. 4 by broken lines.) The first imaginary cut plane X1 intersects the first and second sides 320, 322 midway between the first and second ends 316, 318 and also intersects the top face 325. The second imaginary cut plane X2 is substantially perpendicular to the first cut plane X1 and intersects the first and second ends 316, 318 midway between the first and second sides 320, 322. Also, the second imaginary cut plane X2 intersects the top face 325 of the remote control unit 310. As shown in the embodiments represented in FIG. 4A, the casing 314 is substantially symmetric about each of the first and second imaginary cut planes X1, X2. It will be appreciated that the casing 314 could be symmetric about only one of the imaginary cut planes X1, X2 without departing from the scope of the present disclosure. It will also be appreciated that one or more of the imaginary cut planes X1, X2 could bisect the remote control unit 310 at any suitable location.

The remote control unit 310 further includes a transmitter schematically illustrated at 326. The transmitter 326 is operable for transmitting one or more control signals for controlling an electronic device, such as a television, audio equipment, air conditioning equipment, ceiling fans, or any other suitable device. It will be appreciated that the remote control unit 310 can control any suitable electronic device remotely as will be discussed. Furthermore, the transmitter 326 can be of any suitable type. In some embodiments, the transmitter 326 transmits radio frequency (RF) signals; however, it will be appreciated that the transmitter 326 can be of any suitable multi-directional transmitter. It will also be appreciated, however, that the transmitter 326 can be of any suitable directional transmitter, such as an infrared (IR) transmitter, without departing from the scope of the present disclosure.

The remote control unit 310 also includes a plurality of input features, generally indicated at 328. The input features 328 can be of any suitable type, such as movable buttons, touchpads, dials, joysticks, and the like. As will be described, a user manipulates one or more of the input features 328 to cause the transmitter 326 to transmit the control signal for controlling the associated electronic device. For instance, in the embodiments represented in FIG. 5, the remote control unit 310 is used to control a television 330, having a receiver 332. When the input features 328 are manipulated, the transmitter 326 transmit one or more control signals currently associated with the input features 328 that the user manipulates. Once the receiver 332 receives the transmitted control signal(s), the television 330 operates accordingly. It will be appreciated that the remote control unit 310 can be used for any suitable control of the television 330, such as channel control, volume control, power on/off, and the like.

Figure 5:
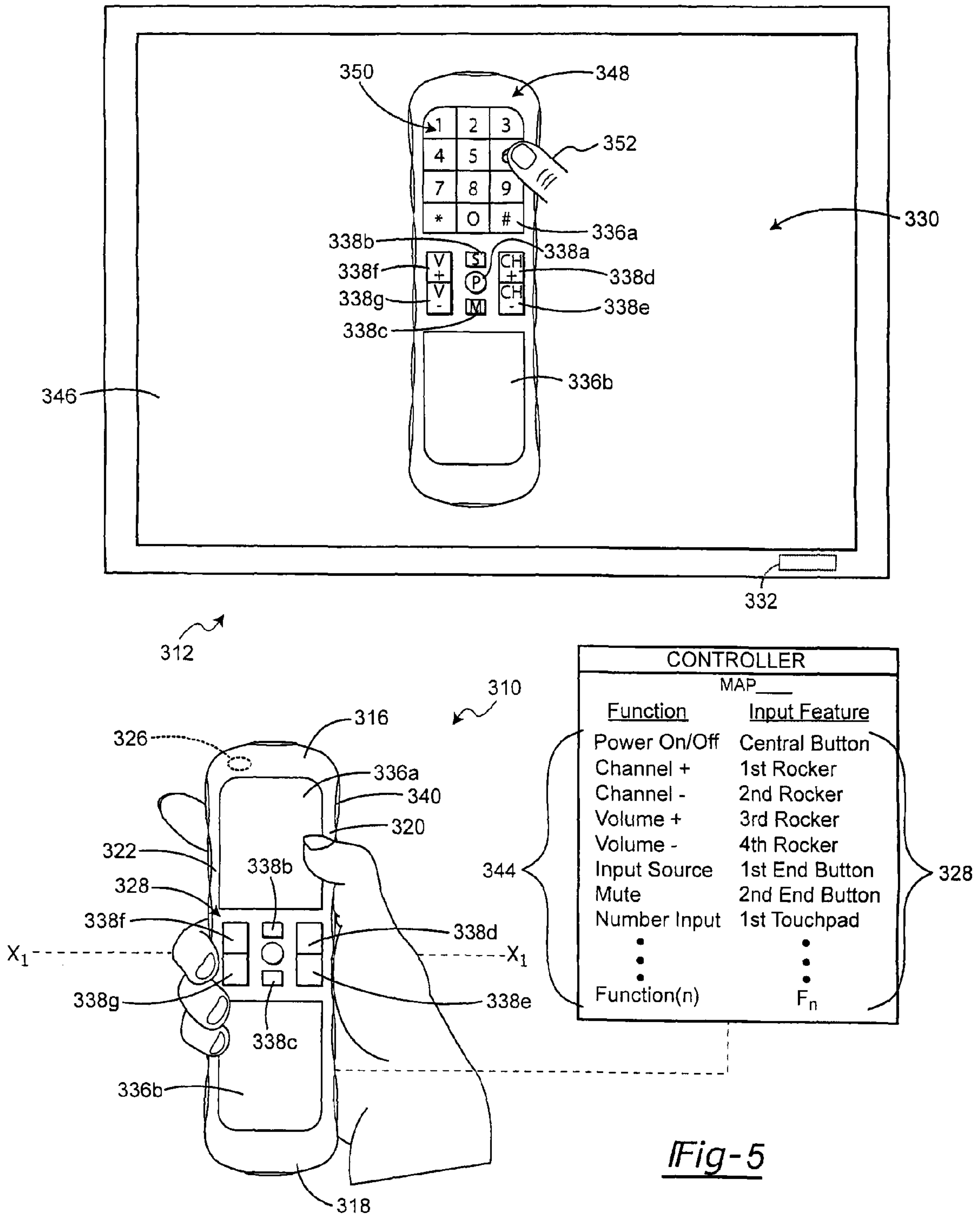
FIG. 5 is a schematic view of a remote control system that includes the remote control unit of FIG. 4A held by the user in a holding position.

The remote control system 312 can also include a display 346. In the embodiment of FIG. 5, the display 346 is included on the television 330; however, it will be appreciated that the display 346 can be separate from the electronic device controlled by the remote control unit 310. It will be appreciated that the display 346 can also be included on the remote control unit 310 itself. The display 346 displays a virtual representation of the remote control unit 310 (i.e., a virtual remote control unit 348 with virtual input features 328). In some embodiments, when the user picks up or otherwise contacts the remote control unit 310, the display 346 automatically displays the virtual remote control unit 348. In the embodiment shown, the virtual remote control unit 348 is substantially similar in appearance to the actual remote control unit 310. Also, the display 346 displays a plurality of icons 350. The icons 350 are displayed so as to indicate the functions associated with each input feature 328. Also, the display 346 displays a cursor 352 corresponding to the location of the user's finger or stylus on the remote control unit 310. The user moves the cursor 352 by moving a finger over the remote control unit 310 as will be discussed. In some embodiments, the cursor 352 is in the shape of a thumb.

In the embodiment shown, the input features 328 of the remote control unit 310 include a first touch sensitive area 334*a* and a second touch sensitive area 334*b*. The touch sensitive areas 334*a*, 334*b* are distinct from each other and separated at a distance so as to define a first touchpad 336*a* and a second touchpad 336*b*. The first and second touchpads 336*a*, 336*b* can be of any suitable type and can recognize when and where the user touches the touchpad 336*a*, 336*b*. The touchpads 336*a*, 336*b* can also trace movement of the users finger(s) thereon for movement of the cursor 352. Furthermore, in some embodiments, each of the touchpads 336*a*, 336*b* can detect when the user touches with two fingers simultaneously. Moreover, in some embodiments, each touchpad 336*a*, 336*b* can recognize contact with the users skin and/or when the user contacts the touchpad 336*a*, 336*b* with a stylist or other indicating device. Also, the touchpads 336*a*, 336*b* can be configured to be movable (i.e., clickable) for providing further user input.

Moreover, in the embodiment shown, the remote control unit 310 includes a plurality of moveable buttons disposed generally between the first and second touchpads 336*a*, 336*b*. More specifically, in the embodiment shown, the remote control unit 310 includes a central button 338*a*, and first end button 338*b*, a second end button 338*c*, a first rocker button 338*d*, a second rocker button 338*e*, a third rocker button 338*f*, and a fourth rocker button 338*g*. The central button 338*a* is located generally in a central location on the top face 325. The first and second end buttons 338*b*, 338*c* are located on opposite sides of the central button 338*a*. The first and second rocker buttons 338*d*, 338*e* are located on a side of the central button 338*a* opposite that from the third and fourth rocker buttons 338*f*, 338*g*. It will be appreciated that the remote control unit 310 can include any number and any style of buttons without departing from the scope of the present disclosure. Furthermore, it will be appreciated that the remote control unit 310 can include any style of input features 328, including those other than touch sensitive areas and buttons.

Manipulation of the input features 328 (e.g., pressing the buttons 338*a*-338*g* and touching the touchpads 336*a*, 336*b*) selectively causes the transmitter 326 to transmit an associated control signal. This will be described in greater detail below.

As shown in FIG. 4, the input features 328 (i.e., the touchpads 336*a*, 336*b* and the buttons 338*a*-338*g*) are collectively disposed in a substantially symmetric manner with respect to the first and second imaginary cut planes X1, X2. In other words, the position and shape of the input features 328 are substantially symmetric with respect to the first and second cut planes X1, X2. Specifically, in the embodiment shown, the first and second touchpads 336*a*, 336*b* are located on opposite sides and are disposed at substantially equal distances from the first cut plane X1. Moreover, the first and second touchpads 336*a*, 336*b* are shaped substantially the same. Moreover, each of the first and second touchpads 336*a*, 336*b* are substantially bisected by the second cut plane X2. Furthermore, the array of buttons 338*a*-338*g* is substantially bisected by each of the first and second cut planes X1, X2. It will be appreciated, however, that the input features 328 could be symmetric about only one of the cut planes X1, X2 without departing from the scope of the present disclosure. It will also be appreciated that the input features 328 could be symmetric about more than two cut planes.

As will be described in greater detail, the symmetrical layout of the input features 328 allows for various advantages. For instance, the array of input features 328 appears the same in multiple orientations and holding positions. As such, the remote control unit 310 can be operated in a very intuitive manner as will be described.

The remote control unit 310 can also include at least one sensor 340 for detecting the way the user is holding the remote control unit 310. In other words, the sensor 340 detects one of a plurality of holding positions of the remote control unit 310. The sensor 340 can be of any suitable type, such as an acceleration sensor, a contact sensor, a capacitive sensor, a pressure sensor, and the like. For instance, in some embodiments, the sensor 340 detects areas of contact between the user's hand and the remote control unit 310 to detect the holding position of the remote control unit 310. Furthermore, in some embodiments, the sensor 340 is an accelerometer that detects movement of the remote control unit 310, for instance, detecting that the remote control unit 310 has been inverted or otherwise rotated. Pattern recognition methods and features described above can be used to detect the holding position of the remote control unit 310. In some embodiments, the sensor 340 detects and distinguishes between a first holding position and a second holding position. The first holding position and the second holding position are substantially opposite each other. For instance, in some embodiments, the first holding position is inverted with respect to the second holding position as will be described in greater detail. Furthermore, in some embodiments, the user holds the remote control unit 310 in a right hand in the first holding position, and the user holds the remote control unit 310 in a left hand in the second holding position as will be described.

Moreover, as shown in FIG. 4A, the remote control unit 310 includes a controller 342. The controller 342 can include any suitable hardware and/or software. Also, the controller 342 can be housed within the casing 314 and/or can be disposed outside the casing 314 of the remote control unit 310. The controller 342 includes a functional map, which associates a plurality of functions 344 with corresponding ones of the input features 328 of the remote control unit 310.

For instance, in the embodiment of FIG. 5, the remote control unit 310 controls the television 330. The television 330 includes various functions 344 such as power on/off, volume control, channel control, switching the input source, mute, and entry of alphanumeric symbols. Each of these functions of the television 330 can be controlled by manipulating one or more of the input features 328 of the remote control unit 310. The map of the controller 342 associates each of the functions 344 with one or more of the input features 328. For instance, the power on/off function can be associated with the central button 338*a* in the map of the controller 342. As such, when the user presses the central button 338*a*, the television 330 turns on or off. In some embodiments, the most commonly used functions of the television 330 are associated in the map with the buttons 338*a*-338*g* for simple control of the television 330. Also, in some embodiments, other less common functions of the television 330 are associated with the touchpads 336*a*, 336*b* of the remote control unit 310.

As will be described, the controller 342 changes the association of the functions 344 and the input features 328 depending on the holding position detected by the sensor 340 of the remote control unit 310. As such, the remote control unit 310 can operate substantially the same in multiple holding positions. Also, as will be described, the mapping of the functions 344 to the input features 328 can be changed depending on the detected holding position such that the functions 344 are associated with input features 328 in more convenient locations on the remote control unit 310. As such, the remote control unit 310 can be operated in a more ergonomic and intuitive manner.

Figure 6:
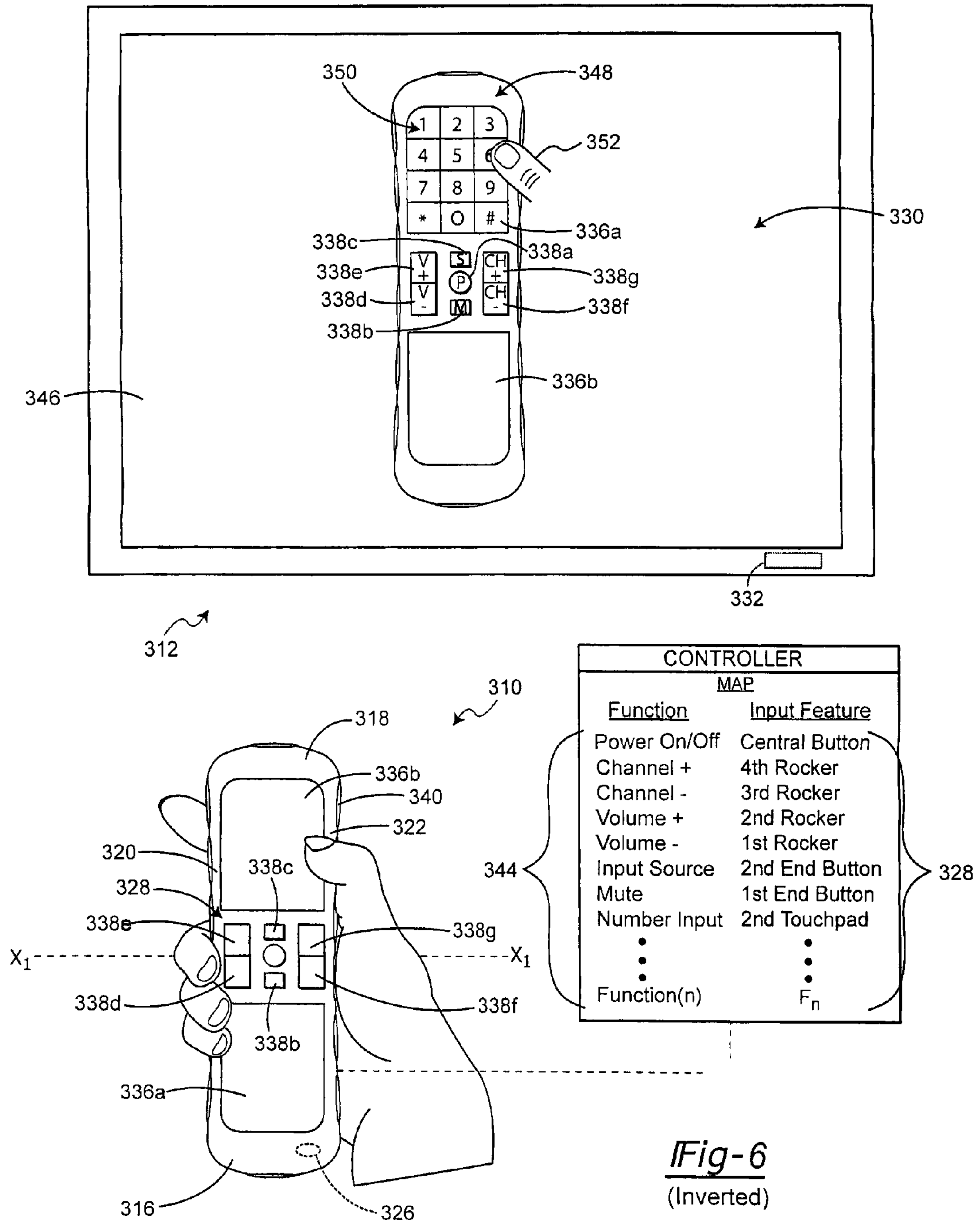
FIG. 6 is a schematic view of the remote control system of FIG. 4A with the remote control unit in another holding position.

Referring now to FIGS. 5 and 6, a comparison will be made of the operation of the remote control unit 310 in multiple holding positions. More specifically, in FIG. 5, the remote control unit 310 is held such that the first end 316 is oriented outward relative to the user, the second end 318 is oriented inward relative to the user, and so on. In contrast, in FIG. 6, the remote control unit 310 is held with the second end 318 oriented outward relative to the user, the first end 316 oriented inward relative to the user, and so on. In other words, the remote control unit 310 is inverted in FIG. 6 as compared to the holding position shown in FIG. 5. Because of the symmetrical layout of the input features 328, the remote control unit 310 appears substantially the same to the user in both holding positions. Also, when the sensor 340 detects the holding position of FIG. 5, the controller 342 maps (i.e., associates) the functions 344 with corresponding input features 328; however, when the sensor 340 detects the holding position of FIG. 6, the controller 342 remaps the functions 344 to those input features 328 on the opposite side of the first cut plane X1.

More specifically, in the holding position of FIG. 5, the numeric input functions 344 (i.e., represented by icons 0 through 9) are mapped to the first touchpad 336*a*, but in the holding position of FIG. 6, the numeric input functions 344 are mapped to the second touchpad 336*b*. Similarly, the icons 350 representing numeric input functions 344 are displayed on the first touchpad 336*a* in the holding position of FIG. 5, but the icons 350 are displayed on the second touchpad 336*b* in the holding position of FIG. 6. The orientation of the icons 350 displayed in FIG. 5 is inverted across the first cut plane X1 with respect to the orientation displayed in FIG. 6 such that the icons appear right side up.

Likewise, the controller 342 remaps the functions 344 associated with the movable buttons 338*a*-338*g* when the holding position is changed from the holding position of FIG. 5 to the holding position of FIG. 6. For instance, in one embodiment, in the holding position of FIG. 5, the mute function 344 is associated with the second end button 338*c*, but in the inverted holding position of FIG. 6, the mute function 344 is associated with the first end button 338*b*.

Accordingly, the remote control unit 310 can be picked up without looking at the remote control unit 310 in either of the inverted positions, and the user can immediately begin using it. As such, the remote control unit 310 can be used in a highly intuitive and convenient fashion. Furthermore, because the icons 350 are remapped by the controller 342 and the icons 350 are displayed on the display 346, the remote control unit 310 can effectuate a wide variety of functions 344 without having to look at the remote control unit 310.

Figure 7:
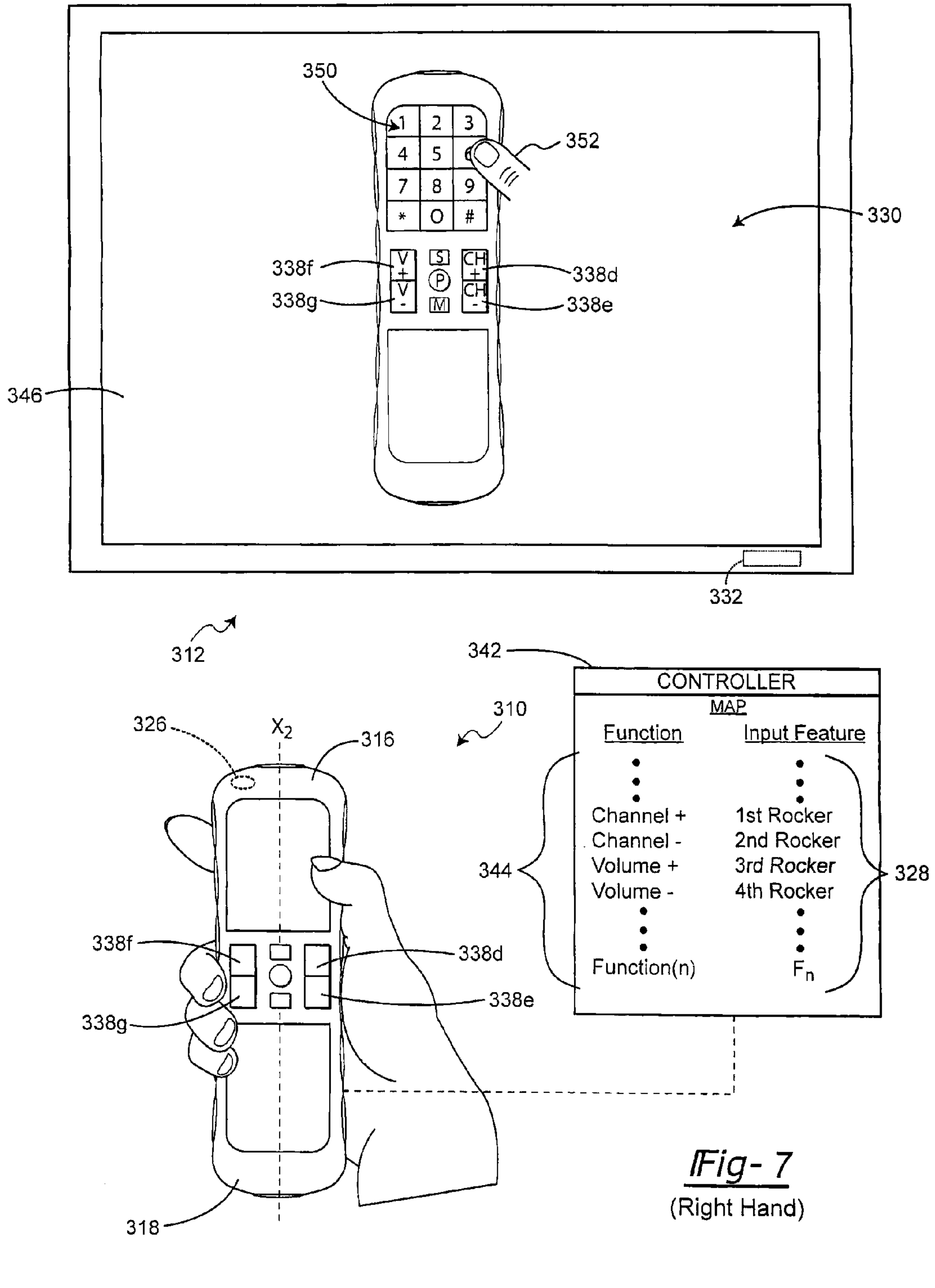
FIG. 7 is a schematic view of the remote control system of FIG. 4A with the remote control unit in another holding position.
Figure 8:
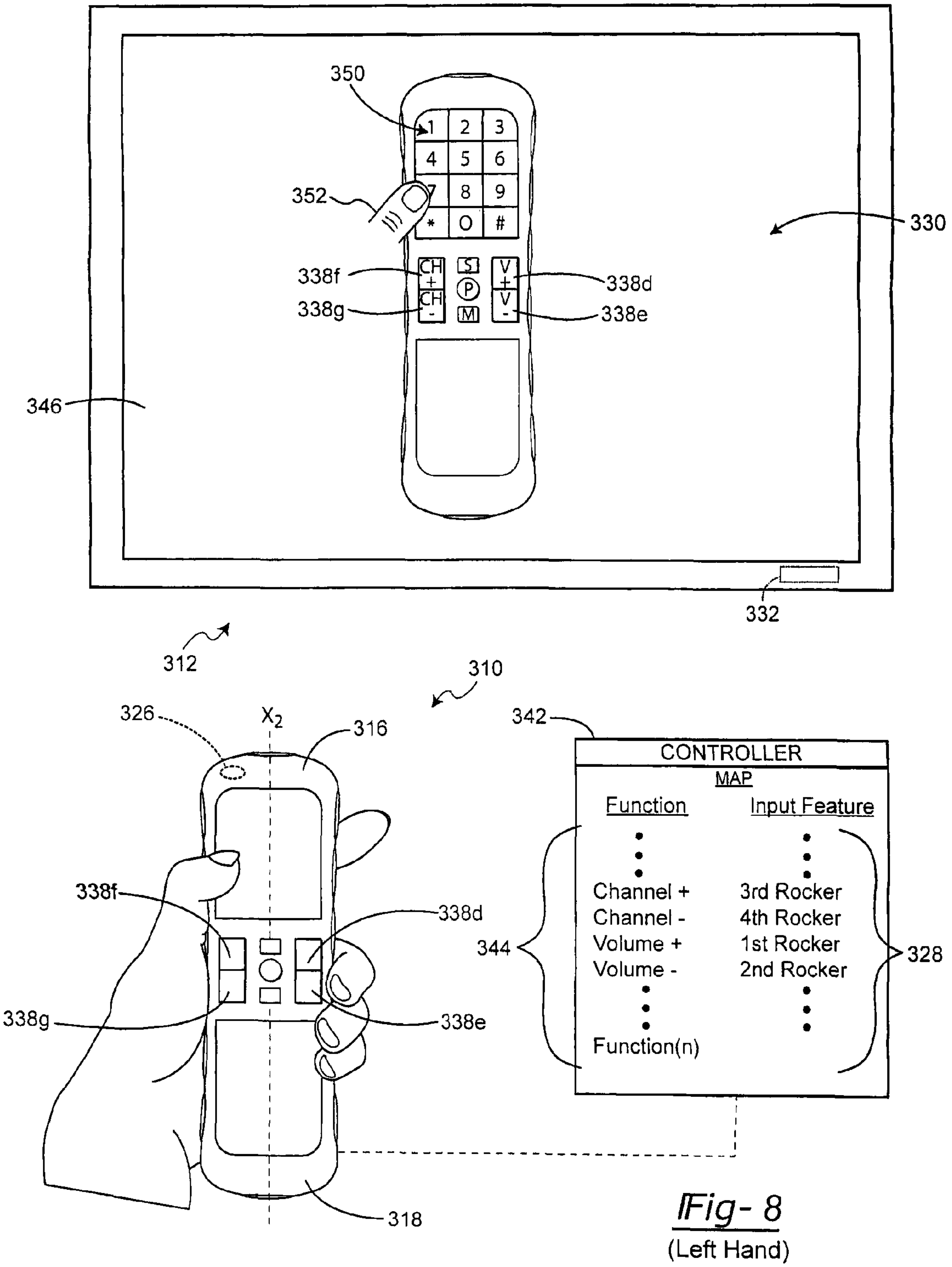
FIG. 8 is a schematic view of the remote control system of FIG. 4A with the remote control unit in still another holding position.

Referring now to FIGS. 7 and 8, mapping of the functions 344 is further illustrated with respect to additional opposite holding positions. For instance, in the embodiment of FIG. 7, the remote control unit 310 is held in the right hand of the user, but in the embodiment of FIG. 8, the remote control unit 310 is held in the left hand of the user. When the user holds the remote control unit 310 in the right hand (FIG. 7), the functions 344 are associated with certain corresponding input features 328; however, when the user holds the remote control unit 310 in the left hand (FIG. 8), the controller 342 remaps the functions 344 to the input features 328 on the opposite side of the second imaginary cut plane X2.

For instance, in one embodiment, the channel control functions 344 are associated with the first and second rocker buttons 338*d*, 338*e* and the volume control functions 344 are associated with the third and fourth rocker buttons 338*f*, 338*g* when the remote control unit 310 is held in the right hand (FIG. 7). However, when the remote control unit 310 is held in the left hand, the channel control functions 344 are associated with the third and fourth buttons 338*f*, 338*g* and the volume control functions 344 are associated with the first and second rocker buttons 338*d*, 338*e*. As such, the channel control functions 344 can be located closer to the thumb of the user for easier access to the channel control functions 344 in both holding positions.

Also, the icons 350 shown on the display 346 are relocated to correspond to the mapping performed by the controller 342. Furthermore, it will be appreciated that any one of the functions 344 and associated icons 350 can be remapped and re-associated as described above, including the functions 344 and icons 350 associated with the touchpads 336*a*, 336*b*.

Moreover, the cursor 352 can change depending on the holding position detected by the sensor 340. In the embodiment shown, for instance, when the remote control unit 310 is held in the right hand, a right thumb is displayed as the cursor 352, but when the remote control unit 310 is held in the left hand, a left thumb is displayed as the cursor 352. As such, operation of the remote control unit 310 is less likely to confuse the user.

Referring now to FIGS. 9 and 10, operation of the remote control unit 310 is discussed further. In the embodiment shown, when the remote control unit 310 is turned to a substantially horizontal position (i.e., a landscape orientation), the sensor 340 detects the change in orientation. As a result, the controller 342 automatically causes the system 312 to enter a text entry mode. More specifically, the display 346 displays a keyboard arranged in any suitable fashion. In the embodiment shown, the display 346 displays a QWERTY keyboard. Also, the display 346 displays text suggestions 360, which suggest complete words that the user can select based on prior inputted text. Also, in the embodiment shown, the remote control unit 310 can be operated using two hands, with one thumb on one of the first and second touchpads 336*a*, 336*b* and the other thumb on the other touchpad 336*a*, 336*b*. The display 346 also displays a corresponding right and left thumb as the cursors 352. Furthermore, the display 346 highlights the individual keys that the cursor 352 overlaps for easier text input.

In comparing FIGS. 9 and 10, it is shown that the controller 342 remaps the input features 328 such that the input features 328 can be manipulated in the same manner regardless of whether the first side 320 or the second side 322 is held outward from the user. More specifically, if the first side 320 is held outward from the user (FIG. 9), the first touchpad 336*a* can be operated with the left thumb and the second touchpad 336*b* can be operated with the right thumb. In contrast, if the second side 322 is held outward from the user (FIG. 10), the second touchpad 336*b* can be operated with the left thumb, and the first touchpad 336*a* can be operated with the right thumb. As such, the user can use the remote control unit 310 in the same fashion regardless of the horizontal (i.e., landscape) holding position. The controller 342 remaps the text entry functions 344 as described above such that the user can operate the remote control unit 310 in the same manner in both orientations shown in FIGS. 9 and 10.

In summary, the symmetric design and remapping operation of the controller 342 allows for substantially intuitive user interaction with the remote control unit 310. As such, the remote control unit 310 can be operated more easily and conveniently. Furthermore, the heads-up operation enabled by the display 346 allows the remote control unit 310 to be operated in the dark, without having to look at the remote control unit 310. The remote control unit 310 can simply be picked up, and the user can begin operating the remote control unit 310 almost immediately.

Moreover, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A wireless remote control unit that selectively transmits a control signal for a given function to remotely control an electronic device, the wireless remote control unit defining an imaginary cut plane that substantially bisects the wireless remote control unit, the wireless remote control unit comprising:

a plurality of input features collectively disposed on a surface of the remote control in a substantially symmetric manner with respect to the imaginary cut plane, the plurality of input features including at least a first input feature and a second input feature, the first and second input features disposed on opposite sides of the imaginary cut plane and symmetric to each other;

a sensor that detects at least a first holding position and a second holding position of the wireless remote control unit, where the orientation of the device in the first holding position differs from the orientation of the device in the second holding position; and a controller that associates the control signal with the first input feature when the sensor detects the first holding position and that associates the control signal with the second input feature when the sensor detects the second holding position, wherein the wireless remote control unit has a single immutable surface that defines two imaginary cut planes that bisect each other at right angles, and wherein the first and second input features are disposed symmetrically to each other on opposite sides of one of the two imaginary cut planes and disposed on the other of the two imaginary cut planes, enabling a user to pick up and use the remote control unit with either right hand or left hand without regard to initial orientation of the remote control unit prior to picking up.

2. The wireless remote control unit of claim 1, wherein the first input feature is a first touch sensitive area and the second input feature is a second touch sensitive area.

3. The wireless remote control unit of claim 2, wherein the first touch sensitive area is a first touchpad and the second touch sensitive area is a second touchpad, wherein the first and second touchpads are distinct from each other and separated at a distance.

4. The wireless remote control unit of claim 2, further comprising a touchpad, wherein a first portion of the touchpad comprises the first touch sensitive area, and wherein a second portion of the touchpad comprises the second touch sensitive area.

5. The wireless remote control unit of claim 1, wherein the plurality of input features comprises a first touchpad, a second touchpad, a first movable button disposed between the first and second touchpads, and a second movable button disposed between the first and second touchpads.

6. The wireless remote control unit of claim 1, wherein the sensor includes at least one of an acceleration sensor, a contact sensor, a capacitive sensor, and a pressure sensor.

7. The wireless remote control unit of claim 1, wherein the first holding position is inverted with respect to the second holding position.

8. The wireless remote control unit of claim 1, wherein a user holds the wireless remote control unit in a right hand in the first holding position, and wherein a user holds the wireless remote control unit in a left hand in the second holding position.

9. A remote control system comprising:

an electronic device;

a wireless remote control unit that selectively transmits a control signal to remotely control the electronic device, the wireless remote control unit defining an imaginary cut plane that substantially bisects the wireless remote control unit, the wireless remote control unit also comprising:

a plurality of input features collectively disposed on a surface of the remote control in a substantially symmetric manner with respect to the imaginary cut plane, the plurality of input features including at least a first input feature and a second input feature, the first and second input features disposed symmetrically to each other on opposite sides of the imaginary cut plane; and a sensor that detects at least a first holding position and a second holding position of the wireless remote control unit, where the orientation of the device in the first holding position differs from the orientation of the device in the second holding position;

a controller that associates the control signal with the first input feature when the sensor detects the first holding position and that associates the control signal with the second input feature when the sensor detects the second holding position; and a display that indicates which of the first and second input features is associated with the control signal.

10. The remote control system of claim 9, wherein the first input feature is a first touch sensitive area and the second input feature is a second touch sensitive area.

11. The remote control system of claim 10, wherein the first touch sensitive area is a first touchpad and the second touch sensitive area is a second touchpad, wherein the first and second touchpads are distinct from each other and separated at a distance.

12. The remote control system of claim 10, further comprising a touchpad, wherein a first portion of the touchpad comprises the first touch sensitive area, and wherein a second portion of the touchpad comprises the second touch sensitive area.

13. The remote control system of claim 10, wherein the plurality of input features comprises a first touchpad, a second touchpad, a first movable button disposed between the first and second touchpads, and a second movable button disposed between the first and second touchpads.

14. The remote control system of claim 9, wherein the sensor includes at least one of an acceleration sensor, a contact sensor, a capacitive sensor, and a pressure sensor.

15. The remote control system of claim 9, wherein the first holding position is inverted with respect to the second holding position.

16. The remote control system of claim 9, wherein a user holds the wireless remote control unit in a right hand in the first holding position, and wherein a user holds the wireless remote control unit in a left hand in the second holding position.

17. The remote control system of claim 9, wherein the wireless remote control unit defines two imaginary cut planes that bisect each other at right angles, and wherein the first and second input features are disposed symmetrically to each other on opposite sides of one of the two imaginary cut planes and disposed on the other of the two imaginary cut planes.

18. The remote control system of claim 9, wherein the display further displays a virtual first input feature and a virtual second input feature, and wherein the display indicates which of the virtual first input feature and the virtual second input feature is associated with the control signal.

19. The remote control system of claim 9, wherein the display further displays an icon for indicating which of the first and second input features is associated with the control signal.

20. A method of operating a remote control system that includes a wireless remote control unit that has a single immutable surface that defines two imaginary cut planes that substantially bisect each other at right angles, the wireless remote control unit also including a plurality of input features collectively disposed on a surface of the remote control in a substantially symmetric manner on opposite sides of one of the two imaginary cut planes and disposed on the other of the two imaginary cut planes, the plurality of input features including at least a first input feature and a second input feature, the first and second input features disposed symmetrically to each other on opposite sides of the imaginary cut plane, the method comprising:

detecting one of at least a first holding position and a second holding position of the wireless remote control unit, where the orientation of the device in the first holding position differs from the orientation of the device in the second holding position;

associating the control signal with the first input feature when the sensor detects the first holding position; and associating the control signal with the second input feature when the sensor detects the second holding position.

21. The method of claim 20, further comprising displaying a virtual first input feature and a virtual second input feature, and indicating which of the virtual first input feature and the virtual second input feature is associated with the control signal.

22. The method of claim 20, further comprising displaying an icon for indicating which of the first and second input features is associated with the control signal.

23. The method of claim 22, further comprising displaying a first cursor when the sensor detects the first holding position and displaying a second cursor when the sensor detects the second holding position.

24. A wireless remote control unit for remotely controlling an electronic device, the wireless remote control unit comprising:

a first button and a second button disposed on a surface of the remote control in a substantially symmetric manner with respect to an imaginary cut plane, the first button and the second button being disposed on opposite sides of the imaginary cut plane and symmetric to each other;

a sensor operable to detect a first holding position and a second holding position of the wireless remote control unit, the first holding position and the second holding position being substantially opposite to each other; and a controller operable to associate a first function with the first button when the sensor detects the first holding position, and associate the first function with the second button when the sensor detects the second holding position, wherein the wireless remote control unit has a single immutable surface that defines two imaginary cut planes that bisect each other at right angles, and wherein the first and second buttons are disposed symmetrically to each other on opposite sides of one of the two imaginary cut planes and disposed on the other of the two imaginary cut planes, enabling a user to pick up and use the remote control unit with either right hand or left hand without regard to initial orientation of the remote control unit prior to picking up.

25. The wireless remote control unit of claim 24, wherein the detection of the first holding position and the second holding position is used to decide which hand of a user is used to hold the wireless remote control unit, and wherein the first function is to increase the volume of the electronic device.

26. The wireless remote control unit of claim 25, wherein the electronic device has a display to display the first function, and wherein no function related to the first function is displayed on the wireless remote control unit when the user selects the first function on the remote control unit.

* * * * *